US007844851B2

(12) United States Patent
Cosmadopoulos et al.

(10) Patent No.: US 7,844,851 B2
(45) Date of Patent: Nov. 30, 2010

(54) SYSTEM AND METHOD FOR PROTECTING AGAINST FAILURE THROUGH GEO-REDUNDANCY IN A SIP SERVER

(75) Inventors: Ioannis Cosmadopoulos, San Francisco, CA (US); Vinod Mehra, Fremont, CA (US); Anno R. Langen, Berkeley, CA (US); Reto Kramer, Issaquah, WA (US)

(73) Assignee: Oracle International Corporation, Redwood Shores, CA (US)

( * ) Notice: Subject to any disclaimer, the term of this patent is extended or adjusted under 35 U.S.C. 154(b) by 297 days.

(21) Appl. No.: 11/956,094

(22) Filed: Dec. 13, 2007
(Under 37 CFR 1.47)

(65) Prior Publication Data
US 2008/0183991 A1    Jul. 31, 2008

Related U.S. Application Data

(60) Provisional application No. 60/869,871, filed on Dec. 13, 2006.

(51) Int. Cl.
*G06F 11/00* (2006.01)
(52) U.S. Cl. .......................................................... 714/4
(58) Field of Classification Search ...................... 714/4
See application file for complete search history.

(56) References Cited

U.S. PATENT DOCUMENTS

| 5,440,727 | A | * | 8/1995 | Bhide et al. ................. 711/117 |
| 5,941,999 | A | * | 8/1999 | Matena et al. ................. 714/6 |
| 6,012,059 | A | * | 1/2000 | Neimat et al. ................. 707/8 |
| 6,134,673 | A |   | 10/2000 | Chrabaszcz |
| 6,625,705 | B2 | * | 9/2003 | Yanai et al. ................. 711/162 |
| 6,625,751 | B1 |   | 9/2003 | Starovic et al. |
| 6,629,260 | B1 |   | 9/2003 | Dancer et al. |
| 6,823,477 | B1 |   | 11/2004 | Cheng et al. |
| 7,073,090 | B2 | * | 7/2006 | Yanai et al. ................. 714/7 |
| 7,246,256 | B2 | * | 7/2007 | De La Cruz et al. ........... 714/4 |
| 7,392,421 | B1 |   | 6/2008 | Bloomstein et al. |
| 7,406,618 | B2 | * | 7/2008 | Fung et al. ................. 714/4 |

(Continued)

OTHER PUBLICATIONS

BEA Systems, Inc., BEA WebLogic SIP Server: Configuring and Managing WebLogic SIP Server, Dec. 2, 2005, BEA Systems, Inc., Version 2.1, pp. 4-13.

*Primary Examiner*—Robert Beausoliel
*Assistant Examiner*—Amine Riad
(74) *Attorney, Agent, or Firm*—Fliesler Meyer LLP

(57) ABSTRACT

The SIP server deployment can be comprised of an engine tier that provides high throughput processing and a state tier that maintains SIP state data in a set of partitions and replicas. Two sites of SIP server deployments can be configured, each being remotely located with respect to the other. A primary site can process various SIP transactions and communications and upon determining a transaction boundary, replicate the state data associated with the transaction being processed, to a secondary site. Engines in the primary site can generate hints for the state replicas which can be in turn responsible for replicating the SIP session state. The replicas can choose to follow or disregard the generated hints. Upon failure of the primary site, calls can be routed from the failed primary site to the secondary site for processing. Similarly, upon recovery, the calls can be re-routed back to the primary site.

16 Claims, 8 Drawing Sheets

U.S. PATENT DOCUMENTS

| | | |
|---|---|---|
| 7,506,194 B2 | 3/2009 | Appanna et al. |
| 7,606,839 B2 * | 10/2009 | Aronoff et al. .............. 707/201 |
| 2003/0158908 A1 | 8/2003 | Jacobs et al. |
| 2003/0163761 A1 * | 8/2003 | Chen et al. ................... 714/10 |
| 2004/0260967 A1 | 12/2004 | Guha et al. |
| 2005/0022047 A1 | 1/2005 | Chandrasekaran |
| 2005/0203962 A1 | 9/2005 | Zhou et al. |
| 2008/0126832 A1 | 5/2008 | Morosan et al. |

* cited by examiner

SYSTEM AND METHOD FOR PROTECTING AGAINST FAILURE THROUGH GEO-REDUNDANCY IN A SIP SERVER

CLAIM OF PRIORITY

The present application claims the benefit of U.S. Provisional Patent Application No. 60/869,871 entitled SYSTEM AND METHOD FOR PROTECTING AGAINST FAILURE THROUGH GEO-REDUNDANCY IN A SIP SERVER, by Ioannis Cosmadopoulos et al., filed on Dec. 13, 2006, which is incorporated herein by reference in its entirety.

CROSS REFERENCE TO RELATED APPLICATIONS

The following commonly owned, co-pending United States patents and patent applications, including the present application, are related to each other. Each of the other patents/applications are incorporated by reference herein in their entirety:

U.S. Provisional Patent Application No. 60/869,873, entitled SYSTEM AND METHOD FOR EFFICIENT STORAGE OF LONG-LIVED SESSION STATE IN A SIP SERVER, by Ioannis Cosmadopoulos, et al., filed on Dec. 13, 2006;

U.S. patent application Ser. No. 11/956,110, entitled SYSTEM AND METHOD FOR EFFICIENT STORAGE OF LONG-LIVED SESSION STATE IN A SIP SERVER, by Ioannis Cosmadopoulos, et al., filed on Dec. 13, 2007;

U.S. patent application Ser. No. 11/545,648, entitled SIP SERVER ARCHITECTURE FAULT TOLERANCE AND FAILOVER, by Anno R. Langen, et al., filed on Oct. 10, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to managing communications and more particularly to providing redundancy and failover services in a telecommunications network environment.

BACKGROUND

Conventionally, telecommunications and network infrastructure providers have relied on often decades-old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings. Furthermore, latency has been an important issue in addressing the processing of telecommunications, as more and more users expect seemingly instantaneous access from their devices.

Redundancy and failover issues have also become increasingly important in this environment with more users tending to expect speedy and uninterrupted services from their providers. Prior redundancy systems have generally concentrated on migrating data or services from one machine to another upon any crash or failure of a single server. However, they do not typically address the issue of a catastrophic failure in a geographic location. What is needed is a system that can allow failover services across multiple domains or sites, with replication schemes to allow secondary sites to take over in case of catastrophic failure of the primary site.

DETAILED DESCRIPTION

Figure 1:
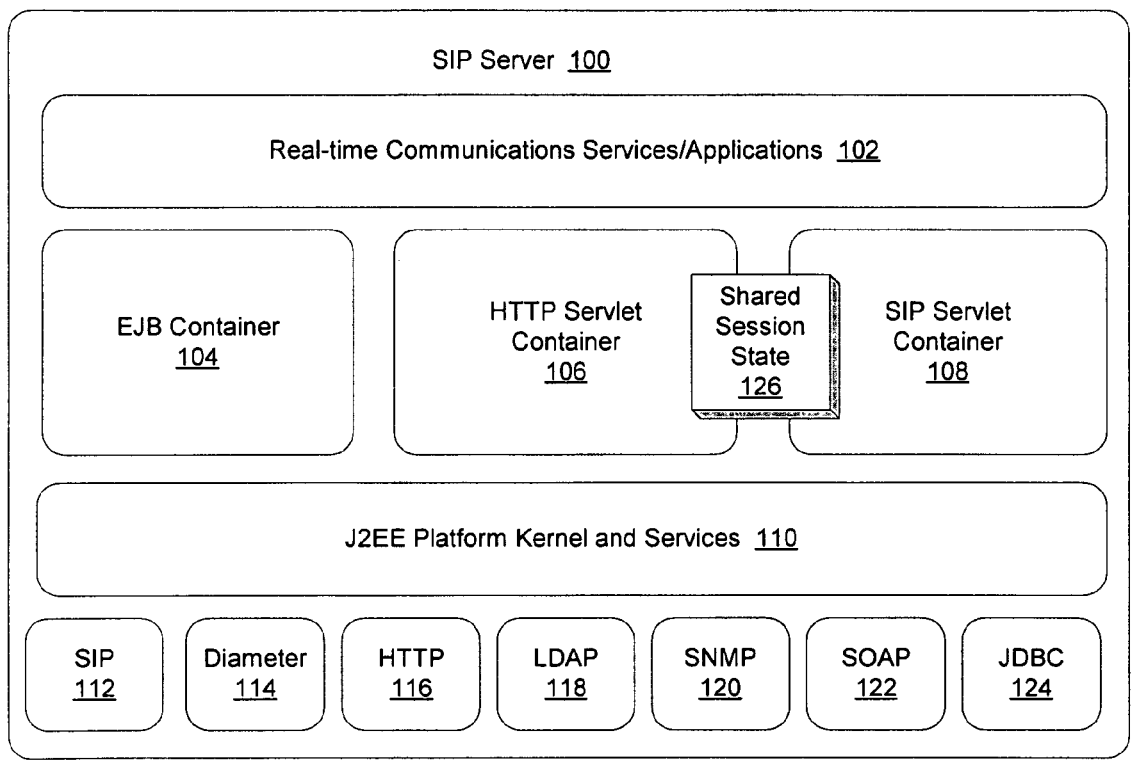
FIG. 1 is an exemplary illustration of various components of the SIP Server, in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device or appliance. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided systems and methods for protecting against failure through geo-redundancy in a session initiation protocol (SIP) server. In various embodiments, the SIP server can be architecturally separated into an engine tier that provides high-throughput processing and a state tier that maintains SIP call state data in a set of partitions having replica nodes. Two sites of SIP server deployments can be configured, each being remotely located with respect to the other. A primary site can continuously process various SIP transactions and communications and upon determining a transaction boundary, the primary site can replicate the state data associated with the transaction being processed to a secondary site. The transaction boundary can be marked when the engines in the primary site determine that the state data is steady and is unlikely to change for a significant period of time. Engines in the primary site can generate hints about steady state for the state replicas on the primary site, which can be in turn responsible for replicating the SIP session state to the secondary site. The replicas can choose to disregard the generated hints if they should determine that the data is likely to change shortly. The replication can be done by state replicas on the primary site placing a message on a JMS queue configured on the secondary site. The engines on the secondary site can continuously monitor their local queue for messages and upon receiving a message, the engine can persist the state data in the message to the secondary site. Upon failure of the primary site, the global routing policy can be changed to begin routing calls from the failed primary site to the secondary site. After this is established, the secondary site can begin to process requests for the backed up call state data. Similarly, upon recovery of the failed primary site, the calls can subsequently be re-routed back to the primary site.

FIG. 1 is an exemplary illustration of various components of the SIP Server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In the embodiment illustrated, the SIP Server 100 is a carrier-class Java Enterprise Edition (J2EE) application server that has been extended with support for the Session Initiation Protocol (SIP) and other operational enhancements that allow it to meet the demanding requirements of next-generation internet protocol (IP) based communications networks. The SIP Server can be used to create, deploy and manage various real-time communications services and applications 102 by telecom operators who wish to provide mobile and fixed multimedia services. As with any Java application server, the SIP server can take advantage of the J2EE Platform Kernel and Services 110 in order to compile, execute and optimize the performance of various programs and applications. In one embodiment, the SIP server 100 is also extended with support for a multitude of standards and protocols such as SIP 112, Diameter 114, HyperText Transfer Protocol (HTTP) 116, Lightweight Directory Access Protocol (LDAP) 118, Simple Network Management Protocol (SNMP) 120, Simple Object Access Protocol (SOAP) 122, Java Database Connectivity (JDBC) 124, and others.

As stated previously, the SIP Server 100 is enabled to support session initiation protocol (SIP). SIP is a protocol used primarily for creating and terminating sessions with one or more participants, such as setting up or tearing down voice or video calls. SIP is described in more detail in RFC 3261 of the IETF SIP Working Group, which is incorporated herein by reference.

The SIP protocol specification defines different types of high level SIP roles, namely user agents (UA) which include UA clients, UA servers, and Back-to-Back user agents (B2BUA). The SIP protocol also defines the roles of Proxies, Registrars and Redirect Servers. Accordingly, the SIP Servlet API of the SIP server 100 allows any of these roles to be coded as a SIP Servlet Application. Furthermore, because SIP is an extensible protocol, the API is also designed to allow developers to easily extend functionality. This can be accomplished by dividing up the SIP processing between the container functions and the applications. Most of the base protocol can be performed by the container, leaving the higher level tasks for the applications to perform. This division of processing can lead to a great amount of flexibility to the SIP Servlet API.

As further illustrated in FIG. 1, the SIP Server 100 can include an Enterprise Java Bean (EJB) container 104, an HTTP Servlet container 106 and a SIP Servlet container 108. Each of these containers can provide an environment that supports the execution of applications developed using its corresponding technology. For example, the EJB container 104 manages enterprise beans contained within it, which in turn provide the business logic for a J2EE application. This management can encompass services such as registering, creating and destroying objects and their instances, providing remote interfaces to objects, managing the state of objects, maintaining security, and coordinating distributed transactions. Similarly, the HTTP container 106 and the SIP Servlet container 108 can be responsible for managing HTTP and SIP servlets respectively.

The SIP stack of the SIP Server 100 can be fully integrated into the SIP Servlet container 108 and is more powerful and easier to use than a traditional protocol stack. For example the higher level abstraction of the SIP Servlet API can free the developer from the mechanics of handling of transaction timers, syntactic evaluation of received requests, generation of non application-related responses, generation of fully formed SIP requests from request objects (which may involve correct preparation of system headers and generation of syntactically correct SIP messages) and handling of lower-layer transport protocols such as Transport Control Protocol (TCP), User Datagram Protocol (UDP) and Stream Control Transmission Protocol (SCTP).

In one embodiment, the Servlet container can provide a Shared Session Context 126 and session application programming interface (API) in order to maintain awareness of the state of the larger converged SIP and HTTP application session. There are many use cases where a converged application, using both SIP and HTTP functions, is desirable. Some examples of these applications include conferencing and click-to-call applications, as well as Presence and User Agent Configuration Management applications. The converged applications can also use other protocols (e.g. Diameter) to perform more advanced functions such as modifying subscriber profile data. Furthermore, the container can provide a whole host of other services including distributing request and response objects to components in a structured way as well as managing the end-to-end object lifecycle, including resource, transaction and session state management.

Figure 2:
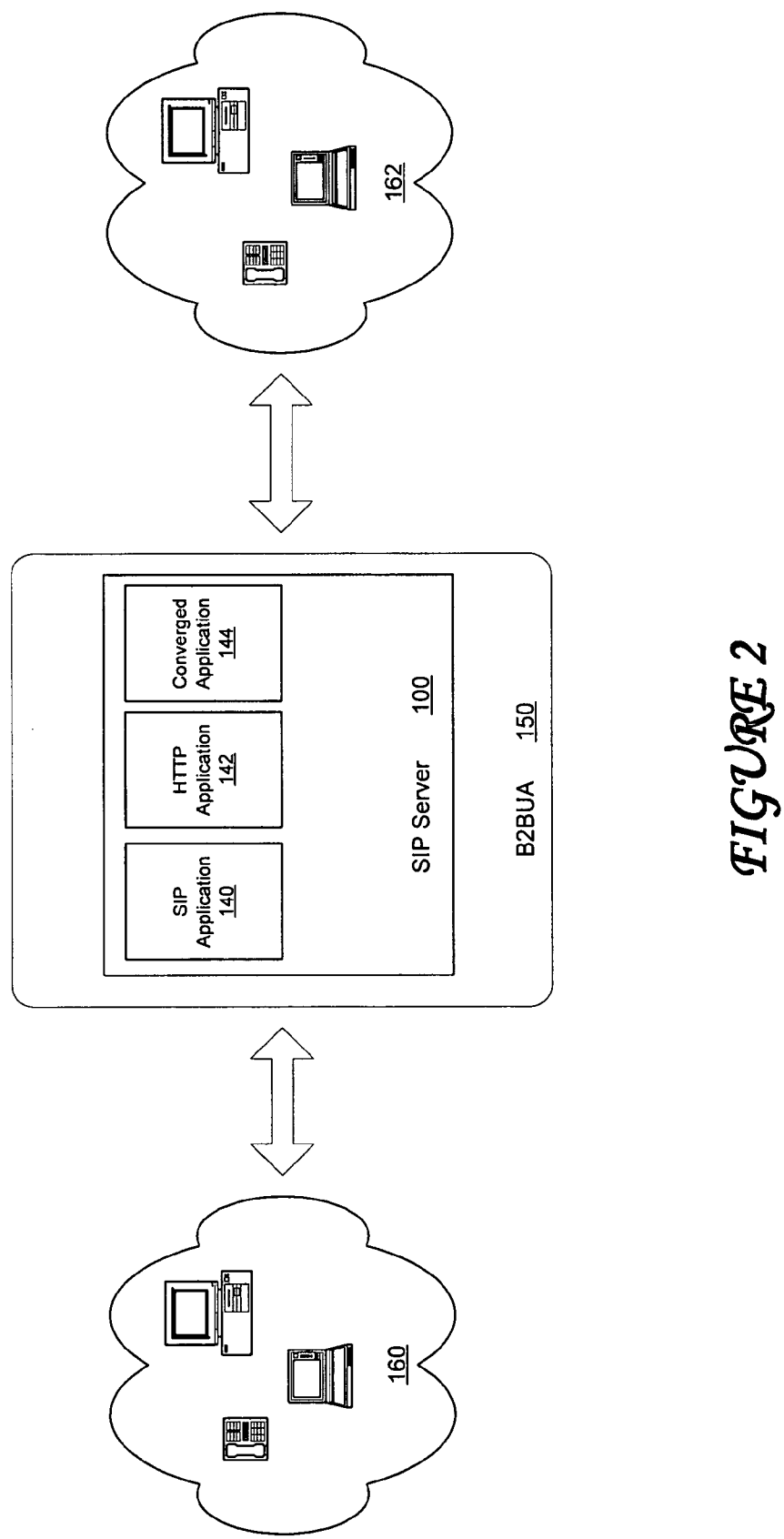
FIG. 2 is an illustration of an exemplary use of the SIP Server, in accordance with various embodiments.

FIG. 2 is an illustration of an exemplary use of the SIP Server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In the embodiment illustrated, the SIP server 100, along with the various applications hosted thereon (e.g. 140, 142 and 144), can be used as a back-to-back user agent (B2BUA) 150 in a typical telecommunications environment. A B2BUA can take the place of an intermediary between communications by user agents 160, 162, which may include various cellular phones, wireless devices, laptops, computers, applications, and other components capable of communicating with one another electronically. The B2BUA 150 can provide multiple advantages, such as controlling the flow of communication between user agents, enabling different types of user agents to communicate with one another (e.g. a web application can communicate with a cellular phone), as well as various security advantages. As one illustration, the user agents can transmit to the SIP server instead of communicating directly to each other and thus malicious users can be prevented from sending spam and viruses, hacking into other user agent devices, and otherwise compromising security. It should be noted that the SIP Server 100 need not necessarily take the role of a B2BUA as illustrated in FIG. 2, but can also be used as a proxy, a redirect server, or some other role defined by the SIP protocol.

Figure 3:
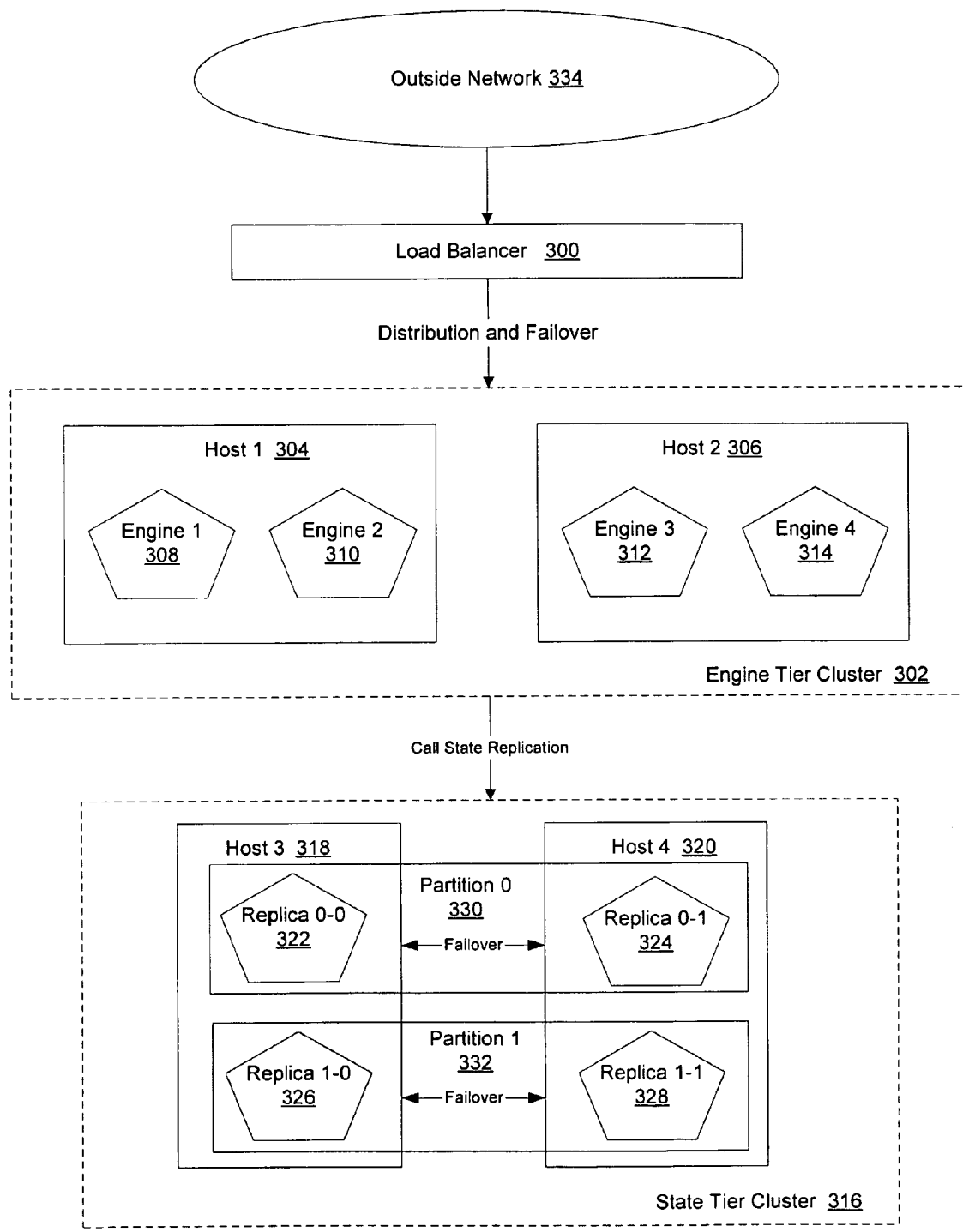
FIG. 3 is an exemplary illustration of a tiered architecture of the SIP server deployment, in accordance with various embodiments.

FIG. 3 is an exemplary illustration of a tiered architecture of the SIP server deployment, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, various messages, such as phone call requests or other transfers of data associated with the SIP protocol, can come into the cluster from the internet (such as over VoIP), phone, or some other type of outside network 334. This message can be received and handled by a load balancer 300 which can be responsible distributing message traffic across the engines (i.e. engine 1 308, engine 2 310, engine 3 312 and engine 4 314) in the cluster which handle the processing of the message traffic. The load balancer can be a standard load balancing appliance hardware device and it is not necessary that it be SIP aware; there is no requirement that the load balancer support affinity between the engines and SIP dialogs or transactions. Alternatively, the load balancer can be implemented as software that distributes the messages to the various engines. In the various embodiments, the primary goal of the load balancer 300 can be to provide a single public address that distributes incoming SIP requests to available servers in the SIP server engine tier cluster 302. Such distribution of requests can ensure that the SIP server engines are fully utilized. The load balancer 300 can also be used for performing maintenance activities such as upgrading individual servers or applications without disrupting existing SIP clients.

In the embodiment illustrated, the SIP server can provide a two-tier cluster architecture model to handle the incoming messages. In this model, a stateless engine tier cluster 302 can process all signaling traffic and can also replicate transaction and session state to the state tier cluster 316 which in turn can be divided into multiple partitions. Each partition can consist of any number of nodes (replicas) distributed across any number of hosts such as host 3 318 and host 4 320 which can be implemented as computers linked in a cluster type network environment. For example, partition 0 330 can include state replica 0-0 322 and a state replica 0-1 324 which can maintain copies of the call state information of the partition. The state tier cluster 316 can be an n-way peer-replicated Random Access Memory (RAM) store that maintains various data objects which can be accessed by the engine nodes in the engine tier. In this manner, engines can be provided a dual advantage of faster access to the data objects than retrieving data from a database while at the same time, engines can be freed up from having to store the data onto the engine tier itself. This type of separation can offer various performance improvements. The state tier can also function as a lock manager where call state access follows a simple library book model, (i.e. a call state can be checked out by one SIP engine at a time).

On the other hand, the engine tier cluster 302 can be implemented as a cluster of SIP server instances that hosts the SIP servlets which provide various features to SIP clients. In one embodiment, the engine tier is stateless, meaning that the SIP session state information is not persisted in the engine tier, but is obtained by querying the state tier cluster 316 which can in turn provide replication and failover services for SIP session data.

In one embodiment, the engine nodes write state data to all the replicas of the appropriate partition so that failover can be provided between the replicas in the event that one should crash or fail. However, when retrieving state data from the partition, the engine does not require all of the replicas to transmit the data. Thus, in order to minimize the traffic and network load, each partition can designate a primary replica in charge of responding to the engine queries with the appropriate data. This primary replica can be selected in a variety of ways. For example, the first replica to boot up in a partition can be designated the primary replica and this will be designated as the replica that is in charge of returning data to the requesting engine. If multiple replicas boot up at the same time, there can be a handshaking process during which the replicas themselves determine which one of them will be designated as the primary. Other algorithms can also be used to determine the primary replica and the invention is not intended to be limited to any one particular algorithm.

The primary overall goal of the engine tier 302 can be to provide maximum throughput combined with low response time to SIP clients. As the number of calls or their duration increases, more server instances can be added to the engine tier to manage the additional load. It should be noted however, that although the engine tier may include many such server instances, it can be managed as a single, logical entity. For example, the SIP servlets can be deployed uniformly to all server instances by targeting the cluster itself and the load balancer need not maintain affinity between SIP clients and individual servers in the engine tier.

In various embodiments, the state tier cluster 316 can be implemented as a cluster of SIP server instances that provides a high-performance, highly-available, in-memory store for maintaining and retrieving session state data for SIP servlets. This session data may be required by SIP applications in the SIP server engine tier 302 in order to process incoming messages. Within the state tier 316, session data can be managed in one or more partitions (e.g. partition 0 330 and partition 1 332), where each partition manages a fixed portion of the concurrent call state. For example, in a system that uses two partitions, the first partition 0 330 could manage one half of the concurrent call state (e.g. A-M) and the second partition 1 332 can manage the other half (e.g. N-Z). With three partitions (not shown), each can manage a third of the call state and so on. Additional partitions can be added as needed to manage large number of concurrent calls or incoming messages.

In one embodiment, within each partition, multiple state servers can be added to provide redundancy and failover should the other servers in the partition fail. When multiple servers participate in the same partition, those servers can be referred to as replicas because each server maintains a duplicate copy of the partition's call state. For example, partition 0 330 can maintain its state information in replica 0-0 322 and replica 0-1 324. In some embodiments, the replicas can be distributed over multiple hosts (e.g. host 3 318 and host 4 320) in order to provide host-to-host failover services in cases where a computer crashes. Furthermore, to increase the capacity of the state tier 316, the data can be split evenly across a set of partitions, as previously discussed. The number of replicas in the partition can be called the replication factor, since it determines the level of redundancy and strength of failover that it provides. For example, if one node goes down or becomes disconnected from the network, any available replica can automatically provide call state data to the engine tier.

Replicas can join and leave the associated partition and each replica can serve as exactly one partition at a time. Thus, in one embodiment, the total available call state storage capacity of the cluster is a summation of the capacities of each partition.

In one embodiment, each partition can peer-replicated, meaning that clients perform all operations (reads/writes) to all replicas in the partition (wherein the current set of replicas in the partition is called the partition view). This can provide improved latency advantages over more traditional synchronous "primary-secondary" architecture wherein one store acts as a primary and the other nodes serve as secondaries. Latency is reduced because there is no wait for the second hop of primary-secondary systems. The peer-replicated scheme can provide better host-to-host failover characteristics as well, since there does not need to be change propagation delay.

In one embodiment, the engine nodes 308, 310, 312 and 314 which are distributed over multiple hosts 304, 306, can be responsible for executing the call processing. Each call can have a call state associated with it. This call state can contain various information associated with the call, such as the ids of the caller/callee, where the caller is, what application is running on the callee, as well as any timer objects that may need to fire in order to process the call flow. The state for each call can be contained in the state tier 316. The engine tier 302, on the other hand, could be stateless in order to achieve the maximum performance. In alternative embodiments, the engine tier can have small amounts of state data stored thereon at selected periods of time.

In one embodiment, a typical message processing flow can involve locking/getting the call state, processing the message and putting/unlocking the call state. The operations supported by the replicas for normal operations can include:

lock and get call state
put and unlock call state
lock and get call states with expired timers In the above described embodiments, the state tier 316 maintains call state in various data objects residing in the random access memory (RAM) of a computer. This can provide significant access speed advantages to the engine tier 302. However, the SIP server can also provide a way for efficiently persisting long-lived state information to a database (disk storage) in order to avoid unnecessary consumption of cluster resources. Since RAM is generally significantly more expensive than database memory, it may be desirable to reduce the number of replicas in the state tier 316 by storing at least some of the session state information to the database. In many cases, database access to data is slower than RAM-based replica access. However, because some SIP communication sessions are not as latency-sensitive as others, the state for these communications can be persisted in the database in order to save the amount of random access memory required by the SIP server deployment. For example, a standard telephone call can be viewed as having three stages—a call setup stage, an active call stage and the call teardown stage (hanging up the call). The call setup stage is typically the most latency-sensitive since users tend to expect immediate results from the server after pressing the call button. However, the call teardown stage may not be as sensitive to latency because after the handset disconnects, it may not matter from the user's perspective how long it will take for the server to complete call termination. As such, session state for call termination can be maintained in a database. Similarly, the active call stage may also be not as latency-sensitive as the call setup stage since it mostly involves communication of voice bits between media servers. It should be noted that this example of a telephone call is provided purely for purposes of illustration and is not intended to limit the invention in any way.

Geographical Redundancy

As has been discussed above, the replicas distributed across multiple hosts in the state tier can provide various failover services when one replica crashes or becomes disconnected. Since each replica maintains a copy of the state data for its partition, the call state can be maintained during any computer failures. However, in the event of a catastrophic failure in a geographic location, all of the replicas at one site may crash or become unavailable, thereby causing loss of state data contained in such partitions. In cases such as this, a system is desirable where call-state data can be replicated across multiple and separate SIP server deployment domains, also hereinafter referred to as sites. This system can implement a replication scheme that allows a secondary site to take over in case of a catastrophic failure of the primary site.

Maintaining redundancy in a partition across several replicas (as previously described) can require a high bandwidth connection between those replicas in order to reduce the latency that may be brought in during modifying all copies of the state information upon every update or SIP transaction. This high bandwidth connection may not be feasible across several geographically remote sites. As such, a new system and method of redundancy is desirable, one that would not require updating the state information upon every SIP communication but would still allow failover services across geographically redundant sites.

In one embodiment, the SIP server 100 can be deployed in a geographically redundant configuration for carriers and providers who have multiple regional data centers and require continuing operation even after a catastrophic site failure. Some providers may choose to install such multiple SIP server domains in different locations in order to bring the SIP server physically closer to the various SIP clients as well as for load distribution purposes. For example, a provider may wish to separate communications by the east coast subscribers (users) and west coast subscribers such that they are handled by separate SIP server sites connected via a wide area network (WAN). The geographically redundant SIP server configuration can then enable those separate SIP server installations, complete with engine and state tier clusters, to replicate call state transactions between one another. Thus, in the event that one site fails (such as in cases of earthquakes, extended regional power outages, etc.), an administrator can choose to redirect all network traffic to the secondary, replicated site in order to minimize lost calls, cable box subscriptions, as well as various other SIP state sessions.

In some embodiments, the standard replication functionality performed by the state replicas in the state tier cluster (as described in connection with FIG. 3) can be highly efficient at providing failover capabilities for a single site over a local area network (LAN), but may require high network bandwidth in order to meet the latency requirements of many production networks. This high bandwidth requirement may be unsuitable for replicating data over large distances, such as from one regional data center to another. In these cases, the geo-redundancy system may be used to replicate transactions across multiple SIP server installations.

In one exemplary use case, a cable box client may be registered with the SIP server to receive notifications of updates and/or other features. Such cable boxes may then maintain constant ongoing sessions with the SIP server which may be replicated to the secondary site. In the event of failure of the primary site, the secondary site can take over processing of the SIP session for the cable box without requiring the cable box to end the session and re-connect at a later time. Furthermore, geo-redundancy can allow a smooth transition back to the primary site upon recovery, rather than overloading the backend systems with large numbers of clients attempting to reconnect.

Figure 4:
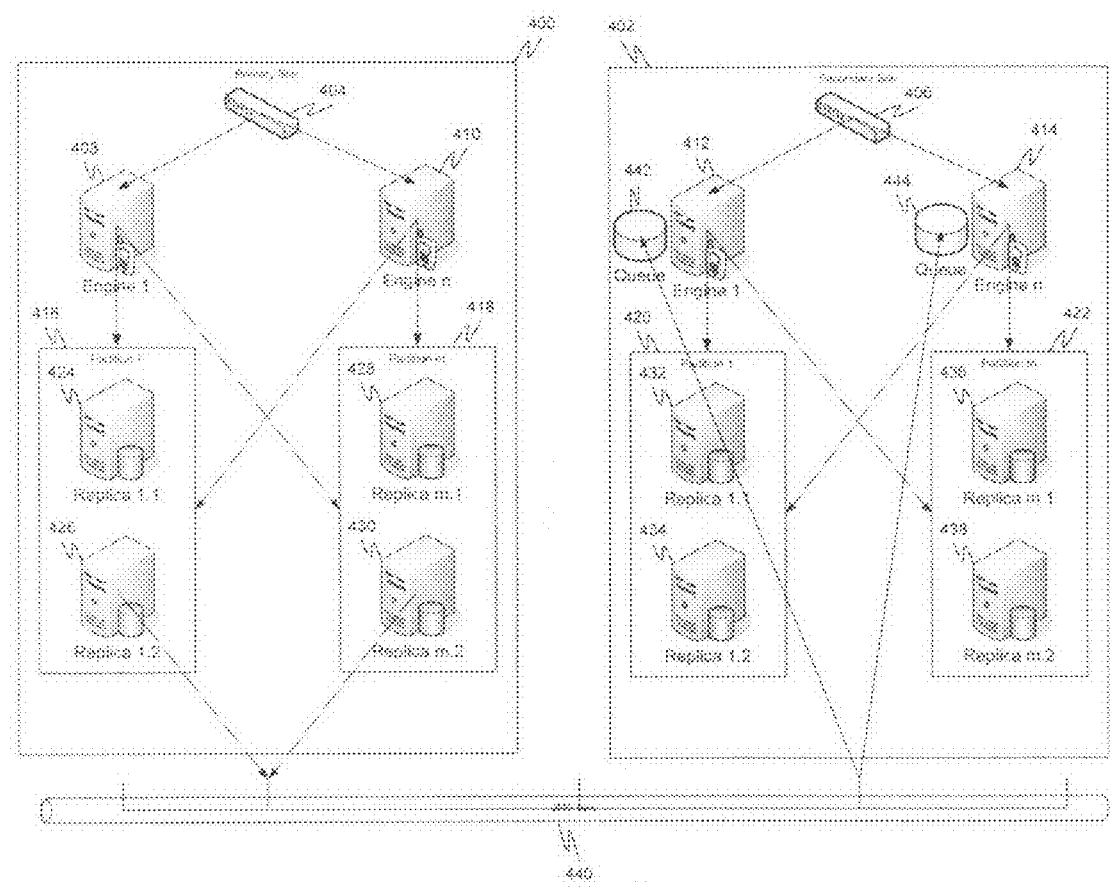
FIG. 4 is an exemplary illustration of the geographically redundant system configuration of the SIP server, in accordance with various embodiments.

FIG. 4 is an exemplary illustration of the geographically redundant system configuration of the SIP server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, two SIP server sites (domains), a primary site 400 and a secondary site 402 can be set up by a service provider in order to protect against catastrophic failures of one such site. Each site can be deployed and configured with its own engine tier of engine nodes (408, 410, 412 and 414), as well as a state tier of state nodes (424, 426, 428, 430, 432, 434, 436, 438) which can maintain session state information in a set of partitions (416, 418, 420, 422). Each site can also implement one or more load balancers (404, 406) in order to distribute the various SIP messages and communications to the engine tier.

When a call is initiated on the primary SIP server site 400, call set up and processing occurs normally. When a transaction boundary is reached, the state data associated with the call can be written, in memory, to the primary site's 400 state tier and become eligible for replication to the secondary site 402. The SIP server may be configured to aggregate multiple call states for replication in order to minimize the network usage.

In one embodiment the transaction boundary is determined by the engine nodes 408, 410 of the primary site 400. It may not be efficient to replicate session state after every single message update or transaction/communication by the engine tier. Some compromise in the form of decreased granularity may be desirable in order to maintain the low latency processing of the engines. As such the transaction boundary can be a point in time when the state information is deemed to be steady, i.e. it is unlikely to change for a significant period of time. After this point in time no more immediate communication or processing is expected by the engine node for the particular call, at least none that would change the call state information. For example, during the three stages of a typical SIP call (as described above), there can be a period of high amount of processing activity on the engine node during the call setup stage. This stage can be followed by a period of quiescence (active call stage) during which most of the communication is done by the media servers transmitting voice bits between the clients. Finally, during the call termination stage, there may be another period of activity on the SIP server during which the call teardown processing is performed by the engine tier. As such, in one embodiment, the engine nodes may choose to mark a transaction boundary at the end of the first period of high activity (call set up stage) and make the state data eligible for replication to the secondary site at that time. In an alternative embodiment, the transaction boundary can be marked by the establishment of a subscription by a SIP client such as when a cable box subscribes to receive notifications/updates, etc. In other embodiments, the transaction boundary can be determined in various other ways. The transaction boundary can also be overridden using application code, as will be discussed below.

At this point in time, the engine nodes 408 and 410 can provide a hint to the state replicas, indicating that a transaction boundary has been reached, i.e. that no more immediate processing is expected for the particular call associated with the session state and that the state is ready to be replicated. For example, the PutAndUnlock method can have an added integer flag "flags," a bitmask which can encode a Boolean value hint that a state be persisted. Upon reading the hint, the state replicas can replicate the call state to the secondary site. Alternatively, the state replicas can choose to disregard the hint and not replicate the data.

In one embodiment, the application can also have an influence in the hinting process. For example, the servlets running inside the Servlet container can be designed to produce a hint to the engine node at the application code level. In some cases, an application may be the most authoritative and be able to best determine when a period of high processing activity ends in order to enable replication of the data sometime following this period. The engines can be designed to receive hints from the application code in determining when a hint to the state replicas should be provided. As such, there can be two levels of hinting—one being done by the application to the engine node, and the other being done by the engine node to the state node.

Upon receiving the hint, the state tier can choose to follow it or disregard it. The state replicas can be provided with the logic for determining whether to follow or ignore the hints received from the engine tier. For example, a situation can occur when a state replica receives a hint indicating that replication should occur, but shortly after the hint, the replica receives another request (e.g. from a different engine) for the session state that was hinted as being ready for replication. The replica may choose to disregard this hint since the session state is likely to be altered by the processing to follow. Such situations can occur in a variety of settings such as when a user unexpectedly hangs up, orders a video, or changes the session state in some other manner. In another situation, multiple applications can be running on the engine tier and the replica may choose to replicate the data only upon receiving an aggregate view of a steady state across all applications in the engine tier, such as upon receiving hints from each application having access to the state data. Thus, the state tier may choose to ignore or delay hints produced by the engine tier so as to best suit the needs of the particular environment.

In one embodiment, a single replica from a partition can perform the actual replication of the call state to the secondary site in order to eliminate duplicates and improve performance. For example, replica 426 can be responsible for replicating the state contained in partition 1 416 and replica 430 can be responsible for replicating the state maintained in partition m 418. Various algorithms can be implemented to determine which replica node in the partition will be the sender of data. For example, as previously discussed, the first replica to boot up in a partition can be designated the primary replica and this node can also be designated as the replica that is in charge of replicating the data to the secondary site. Alternatively, another replica can be designated instead of the primary.

The state replication can be performed by transmitting the data to the engine nodes on the second site which can in turn persist the data appropriately. For example, a single replica (426, 430) in the partition can place the call state data to be replicated on a Java Messaging Service (JMS) queue (442, 444) configured on the secondary replica site 402. JMS is a standard technology used for sending messages between two or more clients. The JMS queue can be viewed as a staging area for messages that have been sent via the JMS bus 440 and are waiting to be read by the appropriate client. It can be used to make the messaging service between engines and state replicas distributed and highly available in order to reduce or eliminate the loss of data. It should be noted, however, that it is not necessary for the invention that JMS be specifically implemented and other such technologies can be used for exchanging messages.

In one embodiment, data is transmitted to one of the available engines (412, 414) in a round-robin fashion. Engines at the secondary site can monitor their local queue (442, 444) for new messages and upon receiving a message, the engine can persist the call state data and assign it the site identification (ID) value of the primary site. The site ID can distinguish the replicated call state data on the secondary site from any other call state data which may be actively managed by the secondary site. For example, it may be advantageous that certain portions of the state data, such as various timer objects, remain dormant on the secondary site so that timer processing does not become a bottleneck for performance. Timer objects residing on the state tier can aid the SIP protocol in processing messages, subscriptions, notifications, as well as providing various other features. For example, an initial Ti timer value of 500 milliseconds can control the re-transmission interval for the invite request and responses and can also set the value of other timers. Timers can fire or engine tier servers can periodically poll the partitions of the state tier to determine which timers have expired given the current time. In some embodiments, it may be desirable to deactivate the timers of the replicated call state upon persisting them on the secondary site in order to reduce the processing load. Thus, timers which are not homed are dormant and an API can be provided to activate them upon re-homing.

As such, it may be useful to distinguish the replicated state data from the live (non-dormant) state data being managed on the secondary site. The site ID value marker in the call state can provide a way for such differentiation. For example, each call ID, and hence message, can be uniquely associated with a home or primary site. Similarly, each call ID can be uniquely associated with the secondary site. Upon failure of the primary site, the secondary site can transfer the ownership of these calls to itself. In one embodiment, it is useful to preserve the marker that original ownership was for the other site, so that the SIP calls/messages can be re-homed back to the primary site upon its recovery. For example, at startup, the primary site can request a set of call IDs of re-homed call states from the secondary site. These are the call states that were re-homed to the secondary site on failure. Engines in the primary site which receive messages with call IDs in this keyset can cause the message to be redirected to the secondary site. To recover storage for the keyset, the secondary site may need to inform the primary when such a call is removed.

Continuing with the illustration, the engines (412, 414) can read messages from the queue (442, 444) and persist the state data on the secondary site 402. The state can be persisted in a variety of ways. In one embodiment, the engines can store the replicated state in-memory on the state tier replicas in the secondary site. In an alternative embodiment, the replicated state can be persisted to a database in order to reduce the costs associated with RAM data storage. In this particular embodiment, if the primary site 400 were to fail, performance could be reduced due to slower database access, but the SIP sessions can be maintained nonetheless. The choice of this implementation can be left to the organization deploying the SIP server.

The implementation of storing some SIP session state in-memory on the state tier and other (e.g. long-lived) session state on disk in the database can be divorced from any connection between the primary and secondary sites. In other words, on site can maintain all session state (live and replicated) on the state tier while another can store both on the database. Similarly, both sites may store certain state in memory and other state in the database. This implementation can be specific to the particular deployment of the site and does not need to affect the replication feature of the geographical redundancy across the sites. Thus, for example, the engines on the primary site can replicate state that is stored on the state tier and send it to the engines on the secondary site which may store the state data in a database. Other such implementations can also be chosen. In one embodiment, there is no replication done at the database layer in order to better control when replication is performed by the engine tier.

In some embodiments, the SIP Server can implement an accumulator to allow boxcaring. For example, the accumulator can cut down on the number of updates by only sending the latest update for a given window for any single call ID. As another option, multiple updates can be batched together in a single JMS message. Compression means, as well as other efficiency improvements can also be implemented. In one embodiment, the SIP server can also implement a filter to trim data being replicated. For example, if there is transaction state which does not need to be replicated in order for the geographical redundancy to work, that state data can be trimmed off in order to improve overall performance. In certain of these embodiments, the geographical redundancy feature is most useful for sites that manage long-lived state data, such as state associated with a cable box subscription which may be ongoing. This may be due to some short-lived calls being lost in the transition to a secondary site because, for example, the SIP server may choose to collect data for multiple call states before replicating to another site.

The geographical redundancy feature can enable the SIP server to migrate SIP calls and communications to the secondary site in the event of a catastrophic failure of the primary. For example, upon such a failure of the primary site, the administrator can change the global load balancer policy to begin routing calls from the primary, failed site to the secondary site. After this process is completed, the secondary site can begin processing requests for the backed-up call state data. When a request is made for data that has been replicated from the failed site, the engine can retrieve the data and activate the call state, taking ownership for the call. The activation process can involve setting the site ID associated with the call to local (e.g. zero); and activating all dormant timers present in the call state. In one embodiment, call states are activated for individual calls after those calls are requested on the backup site. In an alternative embodiment, a SipServerRuntimeMBean can include a method such as activateBackup (byte site) that can be used to force a site to take over all call state data that it has replicated from another site. The administrator can execute this method using a configuration script or, alternatively, an application deployed on the server can detect when a request for replicated site data occurs, and then automatically execute the method.

An administrator can also choose to stop replicating call states to a remote site in order to perform maintenance on the remote site or to change the backup site entirely. If disabling the geographical replication on the primary site, one may also remove the backup call states on the secondary site. A runtime MBean can also include a method such as deleteBackup (byte site) that can be used to force a site to remove all call state data that it has replicated from another site. This method can also be executed by a script or an application deployed on the SIP server, as discussed above. Furthermore, various methods can be included to retrieve information and data about the geographically redundant replication, such as getBackupStoreOutboundStatistics( ) which can provide information about the number of calls queued to the secondary site's JMS queue, or getBackupStoreInboundStatistics( ) which can provide information about the call state data that a secondary site replicates from another site. These methods and beans can be implemented using Java Management Extensions (JMX) technology which can supply tools for managing and monitoring applications, devices (such as printers, etc.) system objects, and service oriented networks.

In certain embodiments, there may be several assumptions that can be made regarding the SIP server deployments in order to best implement geographical redundancy. For example, in one embodiment, it is assumed that there is an affinity between the origination of the call and a site, i.e. that all calls originating in a geographical area close to a site are directed to that site. This can be a load balancer or some other artifact that directs messages with the same call ID to the same home site. This load balancer or artifact can be somewhere upstream of the engines meaning that it will receive the call or SIP communication before it arrives to the engine tier.

In another embodiment, it can be assumed that it is acceptable to lose some data on a catastrophic failure of the primary site. Since the SIP server queues data at transaction boundaries, failures that occur before the data is written into the queue may result in the loss of data. Also, in some cases, the SIP server replicates call states across sites only when the transaction boundary changes the call state. If a long-running call (e.g. subscription by a cable box) exists on the primary site before the secondary site is started and the call state remains unmodified, that call's state data may not be replicated to the secondary site. Such calls can be lost during failover. In other embodiments, care can be taken to ensure that this does not happen by implementing other methodologies, outside the scope of this discussion.

In yet another embodiment, it may be assumed that the secondary site is able to support all of the calls from the failed site, as well as from its own geographic location. Essentially this would mean that, in this embodiment, all sites that are involved in a geographically redundant configuration operate at less than the maximum capacity until a failover occurs.

In the preferred embodiment, two sites can be configured to replicate each other's call state data in the manner shown in FIG. 4. Both sites can be responsible for processing its own geographically close calls, and the administrator can then use either site as a secondary site should one of them happen to fail. However, this should not be construed as limiting the invention. For example, in other embodiments, the secondary site can be a mere backup site, which does not process its own calls.

Figure 5:
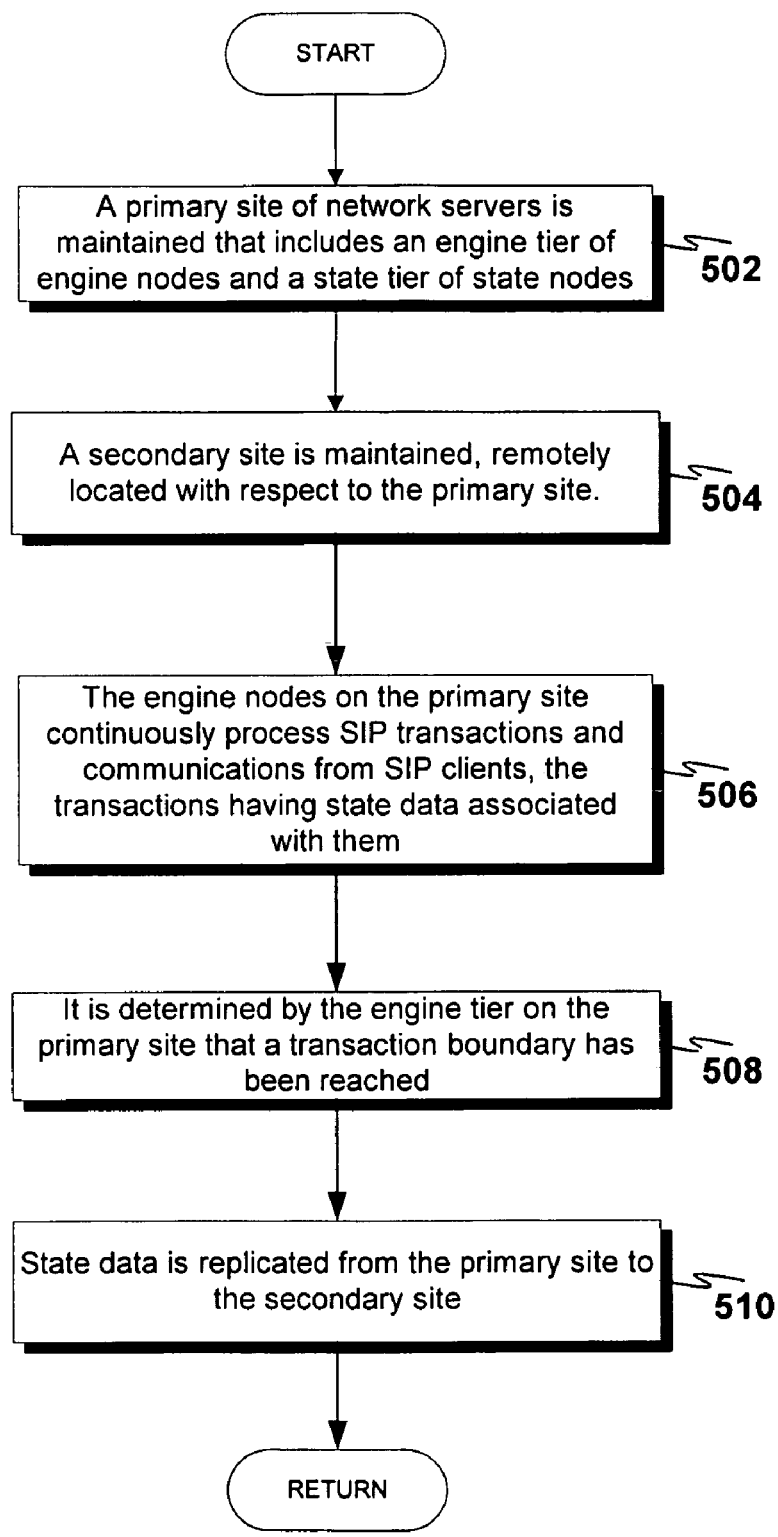
FIG. 5 is an exemplary flow diagram of general geographical redundancy feature, in accordance with various embodiments.

FIG. 5 is an exemplary flow diagram of general geographical redundancy feature, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 502, a primary site deployment typically includes an engine tier where engines process incoming SIP communications and a state tier which maintains the state data associated with those transactions. Furthermore, geographic persistence also includes a secondary site that is remotely located with respect to the primary site, as shown in step 504. For example, the secondary site can be connected to the primary site via a wide area network (WAN).

In step 506, the engine nodes on the primary site's engine tier can be continuously processing messages and communications from SIP clients. During this processing, the engine tier can query and receive the call state data associated with each transaction from the state replicas in the state tier of the primary site.

As shown in step 508, the primary site can determine that a transaction boundary has been reached. This can occur in several different ways. For example, the engine may receive a hint from the application deployed thereon, or alternatively, the engine may contain its own logic to determine that no immediate communication is likely to follow after this particular message update. Upon this determination, the call state data can be replicated to the secondary site, as illustrated in step 510. This replicated state data can subsequently be used in cases of catastrophic failure of the primary site.

Figure 6:
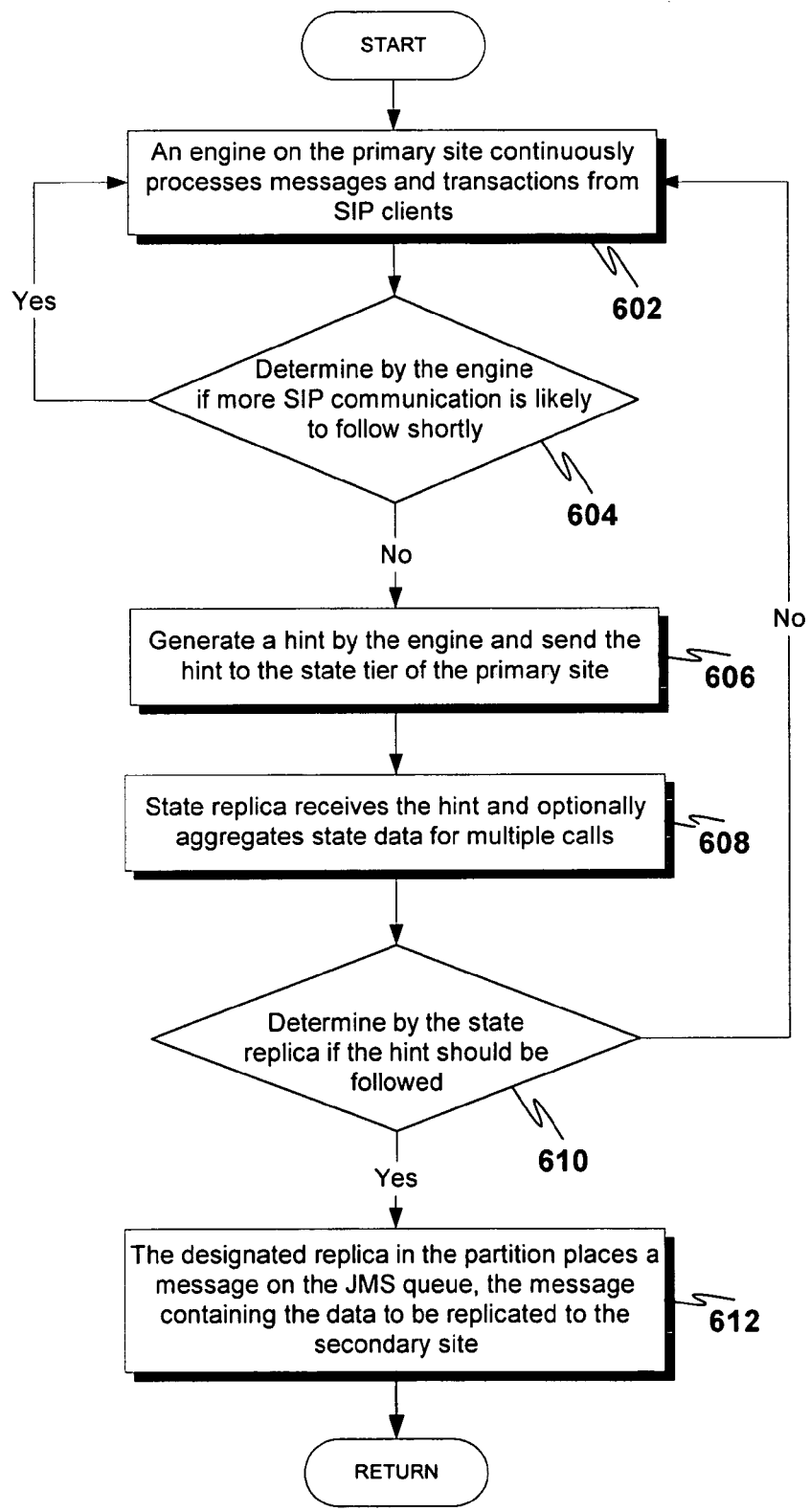
FIG. 6 is an exemplary flow diagram of geographic redundancy functionality on the primary site, in accordance with various embodiments.

FIG. 6 is an exemplary flow diagram of geographic redundancy functionality on the primary site, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 602, an engine node in the engine tier of the primary site can continuously process incoming SIP messages and communications from various SIP clients. For example, the engine may send and receive SIP messages to mobile phones, cable boxes, computers, wireless portable devices and other clients. In step 604, the engine can determine whether more communications are likely to follow that would likely change the call state associated with the session. This determination can be performed by the engine logic based on the previous communications sent/received to the particular client. Alternatively, this determination can be provided or overridden by an application running on the engine providing a hint to the engine. In either case, if more communication is likely to follow immediately, the engine can continue to process the messages uninterrupted. If, on the other hand, the engine determines that it has reached a point in time where the call state is not likely to change any time soon, the engine can generate and provide a hint to the state replicas, as illustrated in step 606. The hint can be sent to the replica and can indicate that a transaction boundary has been reached, as determined by the engine node. The state replica can receive the hint, as shown in step 608. Optionally, the replicas can wait and aggregate call state data for multiple calls/sessions before replicating the state data. In step 610, the state replica can determine whether the hint should be followed. For example, the default decision by the replica can be to follow the hint unless a specified event has occurred, such as the call state data having been immediately requested again, subsequent to receiving the hint. Alternatively, the state replica can determine whether all applications having access to the particular call state data are finished processing/altering it, before deciding to replicate the state. In step 612, a single state replica in the partition (e.g. the primary replica) can replicate the state data to the secondary site by placing a message on the JMS queue configured on the secondary site. This message can contain the particular state data that has been hinted as being ready, as well as possibly other aggregated call state to be replicated. This data can then be transmitted to the engines on the secondary site in a round-robin fashion, as will be discussed below.

Figure 7:
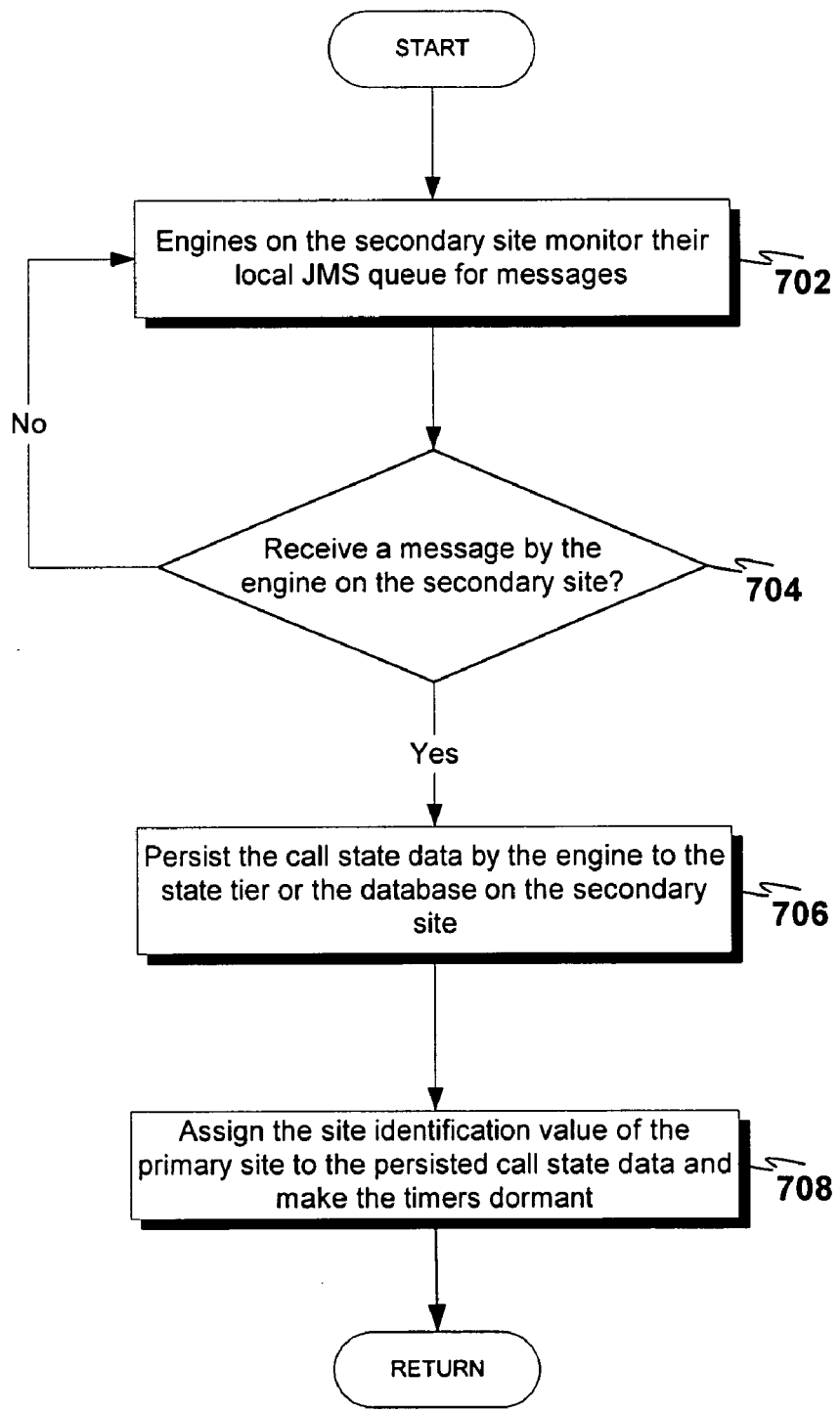
FIG. 7 is an exemplary flow diagram of geographic redundancy functionality on the secondary backup site, in accordance with various embodiments.

FIG. 7 is an exemplary flow diagram of geographic redundancy functionality on the secondary backup site, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 702, the engines on the secondary site can be monitoring their local JMS queue for new messages. This monitoring can be performed in parallel to processing its own local SIP messages and communications on the secondary site. If a message is received by the engine node, as illustrated in step 704, the engine can persist the call state data contained therein to the secondary site, as shown in step 706. For example, the engine can store the replicated state to a database on the secondary site. Alternatively, the replicated state can be stored on the RAM-based state tier. Upon persisting the replicated state, the engine can assign it the site ID value of the primary site, as shown in step 708. This site ID can be used to distinguish the replicated call state from any other call state actively managed by the secondary site. Since the timers of the replicated state remain dormant on the secondary site, it is likely useful to distinguish replicated dormant state data from state data that is actively being processed by the secondary site. The site ID value can be used by the engines in order to achieve this function.

Figure 8:
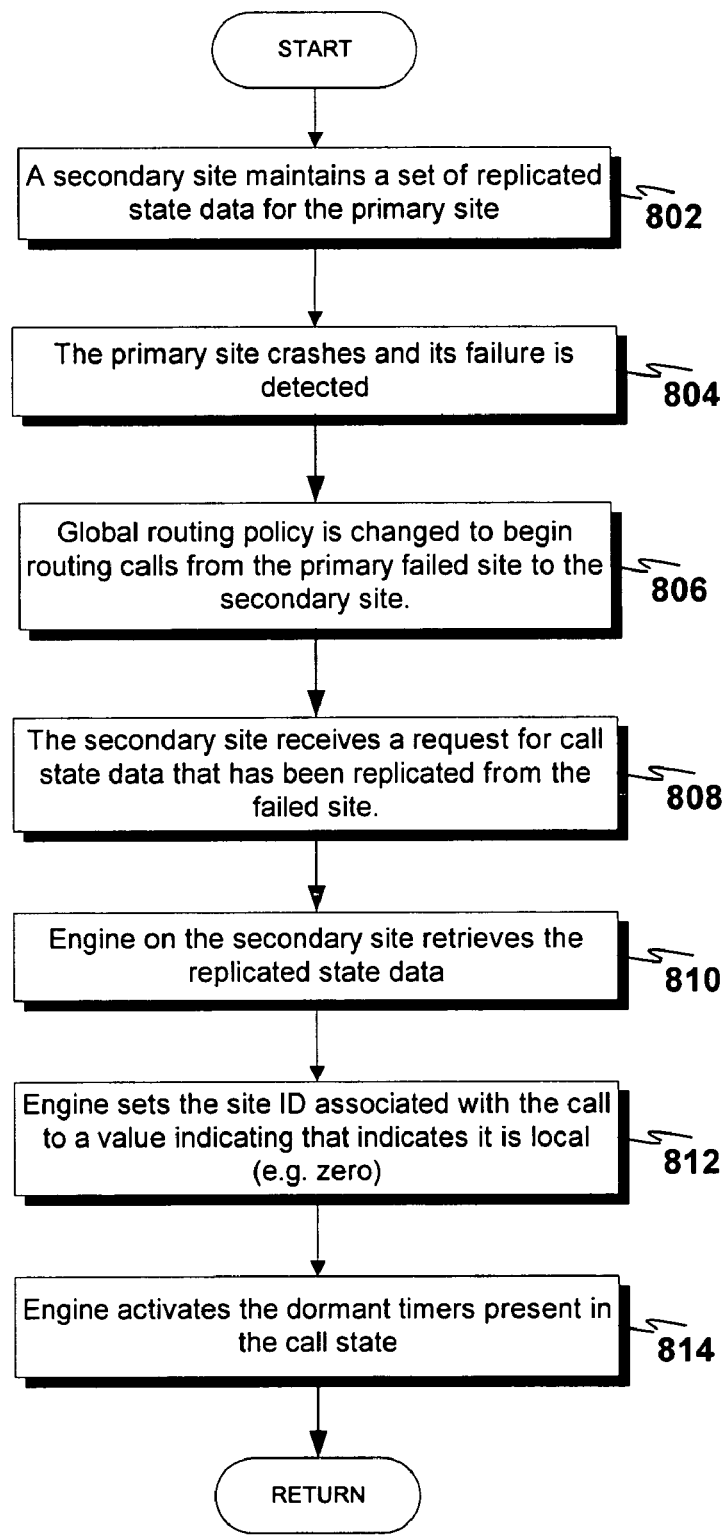
FIG. 8 is an exemplary flow diagram of the failover using geographic redundancy, in accordance with various embodiments.

FIG. 8 is an exemplary flow diagram of the failover using geographic redundancy, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 802, a secondary site can maintain a set of replicated state data for the primary site. In the event that the primary site fails, this failure can be detected (step 804) by a mechanism outside the scope of the two sites, at which point this mechanism can re-home the calls, ensuring that all call IDs previously homed to a failed replica are now homed to a functioning site. The re-homing can be triggered when receiving a message for a call state for which the current site is not a home. At this point the new site could take over as the new home for the call state. Each call state can maintain information about its original home in case the original site comes back up. It should be noted that detecting a failure of a site may be nontrivial and subjective. For example, the site itself may be fully functioning but unreachable from the user agent clients (UACs). Failures may also be transient and re-homing may be preemptive. As such, care should be taken that the mechanism is functioning properly and can detect site failures with a substantial amount of certainty.

In step 806, upon detection of failure of the primary site, the global routing policy is changed to begin routing calls from the primary failed site to the secondary site. After this process is completed, the secondary site begins processing requests for the backed-up call state data. As shown in step 808, the secondary site can receive a request for data that has been replicated from the failed site. As shown in step 810, the engine on the secondary site retrieves the replicated state data and activates the call state, taking ownership of the call. This activation process can involve setting the site ID associated with the call to a value indicating locality, as shown in step 812, as well as activating all dormant timers present in the call state, as shown in step 814. In one embodiment, the call states can be activated only for individual calls and only after those calls have been requested on the backup site. Alternatively, an administrative script or an application can force a site to take over all call state data that it has. This feature can be made configurable and specific to the particular deployment of the SIP server.

Various embodiments that have been described above include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments and containers, as well as user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A computer implemented method for protecting against failure through geographical redundancy, said method comprising:
    maintaining a primary site and a secondary site of network server nodes, each of said primary site and secondary site including an engine tier that processes transactions and a state tier that maintains call state data associated with said transactions;
    processing at least one transaction by the engine tier of said primary site;
    determining, by said engine tier of the primary site, that a transaction boundary of said transaction has been reached; and
    replicating, by said state tier of the primary site, the call state data associated with said transaction from the primary site to the secondary site upon determining that said transaction boundary has been reached;
    wherein replicating, by said state tier of the primary site, the call state data associated with said transaction from the primary site to the secondary site further includes:
    placing a message on a Java Messaging Service (JMS) queue by a single replica node in a partition on said state tier on the primary site, said message containing said call state data to be replicated;
    reading said message from the JMS queue by at least one engine in said engine tier on the secondary site;
    persisting said call state data contained in the message by said engine on the secondary site to at least one of: a database and a state node in said state tier on the secondary site; and
    marking said call state data as being local to the primary site in order to distinguish from call state data being actively managed in said secondary site.

2. The method according to claim 1 wherein determining, by said engine tier of the primary site, that a transaction boundary of said transaction has been reached further includes:
    determining, by an engine node in the engine tier of the primary site, that no more transactions are likely to immediately follow that would alter the state data associated with said transaction;
    generating, by said engine node, a hint indicating that a transaction boundary has been reached; and
    transmitting said hint by said engine node to at least one state replica node in the state tier of the primary site.

3. The method according to claim 2 wherein determining, by said engine tier of the primary site, that a transaction boundary of said transaction has been reached further includes:
    receiving said hint by the state replica node in the state tier of the primary site; and
    determining whether to acquiesce to said hint and replicate the state data associated with said transaction by the state replica node.

4. The method according to claim 1 further comprising:
    detecting a failure of said primary site of network server nodes; and
    routing calls from the primary site to the secondary site such that the secondary site is configured to retrieve and activate call state data that has been replicated from the primary site wherein the activated call state data maintains a marker to denote that the activated call state data has been replicated from the primary site.

5. The method according to claim 4 further comprising:
    detecting recovery and start up of said primary site after said failure; and
    re-routing said calls that were routed to the secondary site, back to the primary site upon detection of said recovery by using said marker.

6. The method of claim 1, wherein the network server nodes of the primary site continuously process calls routed to the primary site in accordance with a global routing policy.

7. The method of claim 6, further comprising:
    detecting a catastrophic failure of the entire primary site and modifying the global routing policy to reroute said calls to the secondary site, wherein the network server nodes of the secondary site employ the replicated state data to process the re-routed calls.

8. The method of claim 1, wherein the primary site and the secondary site are separate server domains located geographically remotely from each other such that a catastrophic failure of the entire primary site will not affect an ability of the secondary site to process said transactions, and wherein each server domain comprises a cluster of interconnected server devices that process said transactions.

9. A computer readable storage medium encoded with a set of instructions for protecting against failure through geographical redundancy, wherein said instructions, when executed by one or more processors, cause the one or more processors to carry out the steps of:
    maintaining a primary site and a secondary site of network server nodes, each of said primary site and secondary site including an engine tier that processes transactions and a state tier that maintains call state data associated with said transactions;
    processing at least one transaction by the engine tier of said primary site;
    determining, by said engine tier of the primary site, that a transaction boundary of said transaction has been reached; and replicating, by said state tier of the primary site, the call state data associated with said transaction from the primary site to the secondary site upon determining that said transaction boundary has been reached;

wherein replicating, by said state tier of the primary site, the call state data associated with said transaction from the primary site to the secondary site further includes:

placing a message on a Java Messaging Service (JMS) queue by a single replica node in a partition on said state tier on the primary site, said message containing said call state data to be replicated;

reading said message from the JMS queue by at least one engine in said engine tier on the secondary site;

persisting said call state data contained in the message by said engine on the secondary site to at least one of: a database and a state node in said state tier on the secondary site; and marking said call state data as being local to the primary site in order to distinguish from call state data being actively managed in said secondary site.

10. The computer readable storage medium of claim 9, wherein determining, by said engine tier of the primary site, that a transaction boundary of said transaction has been reached further includes:

determining, by an engine node in the engine tier of the primary site, that no more transactions are likely to immediately follow that would alter the state data associated with said transaction;

generating, by said engine node, a hint indicating that a transaction boundary has been reached; and transmitting said hint by said engine node to at least one state replica node in the state tier of the primary site.

11. The computer readable storage medium of claim 10, wherein determining, by said engine tier of the primary site, that a transaction boundary of said transaction has been reached further includes:

receiving said hint by the state replica node in the state tier of the primary site; and determining whether to acquiesce to said hint and replicate the state data associated with said transaction by the state replica node.

12. The computer readable storage medium of claim 9, further encoded with instructions for:

detecting a failure of said primary site of network server nodes; and routing calls from the primary site to the secondary site such that the secondary site is configured to retrieve and activate call state data that has been replicated from the primary site wherein the activated call state data maintains a marker to denote that the activated call state data has been replicated from the primary site.

13. The computer readable storage medium of claim 12, further encoded with instructions for:

detecting recovery and start up of said primary site after said failure; and re-routing said calls that were routed to the secondary site, back to the primary site upon detection of said recovery by using said marker.

14. The computer readable storage medium of claim 9, wherein the network server nodes of the primary site continuously process calls routed to the primary site in accordance with a global routing policy.

15. The computer readable storage medium of claim 14, further encoded with instructions for:

detecting a catastrophic failure of the entire primary site and modifying the global routing policy to reroute said calls to the secondary site, wherein the network server nodes of the secondary site employ the replicated state data to process the re-routed calls.

16. The computer readable storage medium of claim 9, wherein the primary site and the secondary site are separate server domains located geographically remotely from each other such that a catastrophic failure of the entire primary site will not affect an ability of the secondary site to process said transactions, and wherein each server domain comprises a cluster of interconnected server devices that process said transactions.

* * * * *